United States Patent [19]
Kira

[11] 3,937,568
[45] Feb. 10, 1976

[54] FILM STRIP ADVANCE MECHANISM

[75] Inventor: Hiroshi Kira, Oxnard, Calif.

[73] Assignee: Norman Holtzman, Los Angeles, Calif.

[22] Filed: Feb. 21, 1974

[21] Appl. No.: 444,563

[52] U.S. Cl. .................................. 353/68; 352/129
[51] Int. Cl.² ........................................ G03B 23/00
[58] Field of Search ............... 353/68; 352/129, 163

[56] References Cited
UNITED STATES PATENTS

| 1,727,900 | 9/1929 | Patterson | 352/163 |
| 2,330,709 | 9/1943 | Harper et al. | 353/68 |
| 2,783,680 | 5/1967 | Goldberg | 353/68 |
| 3,003,393 | 10/1961 | Kilday | 352/163 |
| 3,628,856 | 12/1971 | Jungjohann | 353/68 |

*Primary Examiner*—Richard E. Aegerter
*Assistant Examiner*—Larry Jones
*Attorney, Agent, or Firm*—Allan M. Shapiro

[57] ABSTRACT

Advance shaft carries a sprocket for film engagement and carries manual knob for manually-controlled rotation. Framing shaft is rotatable with respect to projector housing and has an o-ring therebetween to serve as a drag brake. Advance shaft is detented with respect to framing shaft by means of an embracing spring. The drag brake of the framing shaft has a greater torque than the detent of the advance shaft with respect to the framing shaft.

6 Claims, 4 Drawing Figures

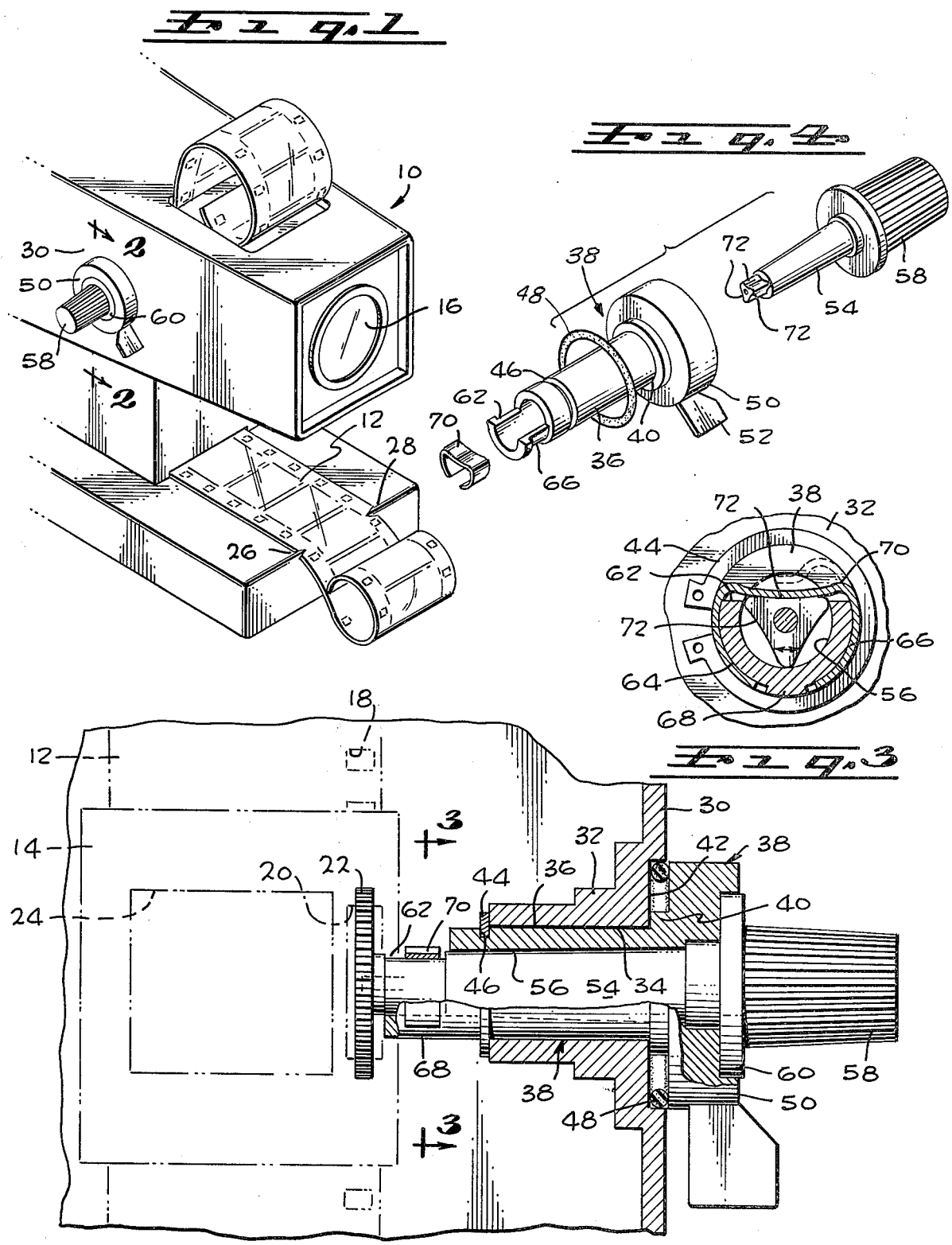

3,937,568

FILM STRIP ADVANCE MECHANISM

BACKGROUND OF THE INVENTION

1. Field of the Invention

This invention is directed to a mechanism to control the advance of a film strip in a film strip projector.

2. Description of the Prior Art

Film strip projectors are well known. There are many patents in existence directed to their optics and to their general structure. Film strip projectors utilize strips of film which have sprocket holes along at least one edge and have spaced scenes or frames along the length thereof. The projectors are arranged so that, when one of the framed scenes is properly positioned with respect to the projector optics, the scene is projected. The projector optics usually include a cropping or framing mask which edgewise limits the illumination of the film strip to the framed size of the scene on the film strip so that only a scene is projected, and not extraneous information.

It is convenient to engage the sprocket holes on the film strip to advance the strip from one scene to another. This can be simply accomplished by means of a manual knob connected to drive a sprocket wheel due to film engagement. However, such a simple drive mechanism does not provide for advance to the predetermined position where the next scene on the film strip is properly aligned with respect to the mask in the projector.

A projector and a film strip advance mechanism are taught in P. J. Kilday U.S. Pat. No. 3,003,393 and others cited therein, the entire disclosure of which is incorporated herein by this reference. The present invention is an improvement over the Kilday disclosure, in that the present invention is directed to an improved, more trouble-free and economic mechanism. In accordance with the present film strip advance mechanism, the film strip is quickly and accurately advanced to a new film strip position, with convenient ease of framing.

SUMMARY OF THE INVENTION

In order to aid in the understanding of this invention, it can be stated in essentially summary form that it is directed to a film strip advance mechanism. The advance mechanism includes an advance shaft which carries a film strip engageable sprocket wheel thereon and which is rotatably mounted within a framing shaft. A detent interengages the shafts. Furthermore, a resilient brake drag is interconnected between the framing shaft and the projector frame for framing adjustment.

It is, accordingly, an object of this invention to provide a film strip advance mechanism which is economic of construction, reliable in operation, and convenient to use. It is a further object to provide a film strip advance mechanism whereby a film strip can be advanced from scene-to-scene by means of rotation of the advance shaft, and the framing of each scene can be adjusted by means of rotation of the framing shaft. It is another object to provide a detent mechanism between the adjustment shaft and the framing shaft in the form of a spring embracing a part of each of the shafts. It is yet another object to provide a resilient brake between the framing shaft and the projector housing in the form of a spring-loaded brake drag.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a perspective view, with parts broken away, of a film strip projector incorporating the film strip advance mechanism of this invention.

FIG. 2 is an enlarged section taken generally along the line 2—2 of FIG. 1.

FIG. 3 is a further enlarged section taken generally along the line 3—3 of FIG. 2.

FIG. 4 is an isometric, exploded view of part of the film strip advance mechanism of this invention.

DESCRIPTION OF THE PREFERRED EMBODIMENT

Film strip projector 10 has optics, including the light source in the rear of the projector housing, and means to focus the light from the light source. The light from the source progresses through film 12 which is positioned beneath mask 14, see FIG. 2. The light transmitted through the scene on film strip 12, which is positioned to be framed within the opening in mask 14, is emitted from objective lens 16. It is focused by the objective lens onto a suitable screen. These features of the film strip protector 10 are conventional, and attention is drawn to other publications for detailed disclosure.

Film 12 is naturally rolled and is fed into a slot in the top of the projector. It passes down through quides behind mask 14. Film 12 has conventional sprocket holes 18 therein. The sprocket holes pass behind slot 20 in mask 14. Sprocket 22 has teeth which engage sprocket holes 18, so that rotation of sprocket 22 advances film strip 12, and the position in which the sprocket stops controls the framing position of scenes on film strip 12 with respect to opening 24 in the mask. As the film is successively advanced from one scene frame to another, the beginning of the film strip extends out of the projector housing. It is engaged under edge-engaging guides 26 and 28 which guide the film strip 12 clear of the front end of the projector housing so that it can naturally coil up without rubbing on adjacent surfaces. From this construction, it can be seen that the angular position of sprocket 22, in rotation about its own axis, controls the position of the film strip and controls the position of scene frames upon the film strip with respect to the opening 24 in the mask. Film strip position control is accomplished by the mechanism of this invention, described below.

As seen in FIG. 2, film strip projector 10 has a housing 30. Housing 30 includes a boss 32 extending inwardly, and boss 32 has a bearing bore 34 therein. Bearing surface 36 on framing shaft 38 fits within bearing bore 34. Framing shaft 38 is rotatably mounted upon a central axis defined by these bearing surfaces. Shoulder 40 on framing shaft 38 limits the inward positioning of framing shaft 38. Shoulder 40 bears against recessed thrust surface 42 in housing 30. Outward motion of framing shaft 38 is limited by snap ring 44. Snap ring 44 engages in snap ring groove 46 and bears against the interior surface of housing boss 32 to prevent withdrawal of shaft 38 from its assembled position illustrated in FIG. 2.

O-ring 48, see FIGS. 2 and 4, is a wavy type spring washer. O-ring 48 is engaged in the space formed beneath flange 50 of framing shaft 38 above thrust surface 42. O-ring 48 resiliently engages both of these surfaces and acts as a spring-loaded brake against rotation of the framing shaft 38 with respect to film strip projector housing 30. The amount of frictional torque which this brake exerts between the framing shaft and the film strip housing is defined below. Tab 52 on the side of flange 50 serves as a convenient manual engagement extension for rotation of framing shaft 38.

Advance shaft 54 extends through bore 56 in framing shaft 38. The outer end of advance shaft 54 is configured to provide manually-engageable advance knob 58. Flange 60 engages in a corresponding bore recessed within the outer end of framing shaft 38 to limit the inward positioning of advance shaft 54. Sprocket 22 is secured to the inner end of advance shaft 54 to limit outward motion thereof. For removal of the advance shaft, sprocket 22 can be removed therefrom. A convenient way of securing sprocket 22 in place upon the left end of advance shaft 54 is by a machine screw, or the like, so that it may be readily disassembled. By means of the foregoing construction, advance shaft 54 can rotate within and with respect to framing shaft 38.

As is seen in FIGS. 2, 3 and 4, the inner end of framing shaft 38 has a flat 62 cut thereacross to intersect bore 56. Grooves 64 and 66, see particularly FIG. 3, extend circumferentially in the outer surface downward from the flat 62 and terminate at a stop shoulder 68. C-shaped spring 70 is formed of flat stock and is bent to embrace the inner end of framing shaft 38 in grooves 64 and 66. In normal positioning, the ends of spring 70 are closely adjacent stop shoulder 68. In the assembled position, the spring 70 resiliently embraces the inner end of the framing shaft within grooves 64 and 66.

The inner end of advance shaft 54 has a plurality of detent flats 72 thereon. When advance shaft 54 is in position within framing shaft 38, these detent flats lie under spring 70. It should be noted that both advance shaft 54 and the bore 56 in which it is positioned are tapered, with the smaller end toward sprocket 22. This tapered construction aids in the assembly. With spring 70 in place, advance shaft 54 is thrust into its bore. When the nose of detent flat 72 approaches spring 70, the nose is lower with respect to the spring because the tapered advance shaft 54 is not fully into its bore. This permits the detent flat 72 to enter under spring 70. As the advance shaft 54 is fully engaged in position, the tapered character of the shaft and its bore cause the detent flat 72 to slightly rise as it is moved in to prestress spring 70.

Now, spring 70 urges advance shaft 54 into a particular angular position with respect to framing shaft 38, as dictated by the detent flats. The number of detent flats 72 is related to the diameter of sprocket 22 and the distance required to advance film strip 12 one frame so that, when advance shaft 54 is rotated from one detent to the next, the film strip is advanced from one frame to the next. As advance shaft 54 is rotated, the spring 70 resiliently permits rotation of the shaft. Spring 70 moves into a position similar to that shown in dotted lines in FIG. 3. This is resilient deflection of the spring so that, when the advance shaft approaches its new position, the spring detents the advance shaft into the proper angular position. The torque of this detent is less than the torque provided by brake O-ring 48 so that, when advance shaft 54 is rotated, framing shaft 38 is not rotated thereby. The spring and flat system provide a reversible detent system which detents accurately in either direction of rotation, as is indicated by the arrow shown in FIG. 3.

When framing is desired, framing shaft 38 is turned so that the frame on film strip 12 is lined up with mask opening 24. Thereupon, rotation of the advance shaft 54 from one detent position to the next moves the film strip from one frame to the next. While three detent flats 72 are shown, it is clear that more or less can be employed, depending upon the diameter of sprocket 22 and the desired amount of film strip advance.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A film strip advance mechanism for a projector having a housing, comprising:
   a framing shaft for rotatable positioning in said housing, said framing shaft having a longitudinal axis and being rotatable about said axis with respect to said housing, a resilient spring for interengaging between said framing shaft and said projector housing to provide resilient braking torque between said framing shaft and said projector housing, removable stop means on said framing shaft for interengaging between said framing shaft and the projector housing to stress said resilient braking torque spring to provide braking torque;
   an advance shaft coaxially rotatably mounted within and with respect to said framing shaft, detent means interengaging between said advance shaft and said framing shaft to resiliently angularly detent said advance shaft with respect to said framing shaft, said detent means interengaging between said advance shaft and said framing shaft comprising a detent flat on said advance shaft and a detent spring at least partially embracing said framing shaft and said flat on said advance shaft so that rotation of said advance shaft with respect to said framing shaft causes resilient detent spring deflection; and
   a sprocket wheel on said advance shaft for advancing a film strip when said framing shaft is rotated.

2. The film strip advance mechanism of claim 1 wherein:
   said advance shaft extends through a bore in said framing shaft, said framing shaft having a slot cut therethrough exposing a portion of said bore, said detent spring engaging in said slot, said detent flat being positioned on said advance shaft adjacent said slot in said framing shaft.

3. The film strip advance mechanism of claim 2 wherein:
   a groove is formed partially around said framing shaft at said flat, with a stop shoulder forming the ends of said groove, said detent spring embracing said advance shaft at said groove and at least partially engaging within said groove, said stop shoulder acting to limit the position of said detent spring with respect to said framing shaft.

4. The film strip advance mechanism of claim 3 wherein:

said framing shaft has a flange thereon, said resilient braking spring engaging under said flange.

5. The film strip advance mechanism of claim 4 wherein:

said removable stop means on said framing shaft is a snap-ring engaging in a snap-ring groove in said framing shaft.

6. The film strip advance mechanism of claim 5 wherein:

said framing shaft has a tapered bore therein and said advance shaft has a tapered exterior surface thereon, said tapered surface on said advance shaft engaging in said tapered bore in said framing shaft.

* * * * *